United States Patent [19]
Cheatham et al.

[11] Patent Number: 5,251,090
[45] Date of Patent: Oct. 5, 1993

[54] SELF SEALING DATA STORAGE ELEMENT

[75] Inventors: Samuel D. Cheatham, Golden; Jerry L. Donze, Arvada, both of Colo.

[73] Assignee: Storage Technology Corporation, Louisville, Colo.

[21] Appl. No.: 743,457

[22] Filed: Aug. 9, 1991

[51] Int. Cl.$^5$ .................... G03B 15/32; G11B 23/02
[52] U.S. Cl. .................................. 360/132; 242/195
[58] Field of Search ............... 360/132, 134; 242/195, 242/197, 199

[56] References Cited

U.S. PATENT DOCUMENTS

| | | | |
|---|---|---|---|
| 4,694,557 | 9/1987 | Gelardi | 242/197 |
| 4,775,115 | 10/1988 | Gelardi | 242/197 |
| 4,977,474 | 12/1990 | Oishi et al. | 360/132 |

*Primary Examiner*—Paul M. Dzierzynski
*Assistant Examiner*—Don Wong
*Attorney, Agent, or Firm*—Duft, Graziano & Forest

[57] ABSTRACT

The self sealing data storage element presents a uniform form factor data storage element that can be used to house any one of a plurality of types of tape media. The tape media is wound around a single reel contained within a housing of predefined external dimensions. The housing includes an opening in one corner thereof through which the tape media is extracted by an associated drive element. In order to enable the drive element to securely grasp the tape media, a leader block is affixed to the end of the tape media nearest the opening in the housing. In order to provide the self-sealing capability, a length of leader tape is provided between the leader block and tape media in order to completely encapsulate the tape media once it is wound around the reel contained within the housing. The leader block is of width at least as great as that as the tape media and preferably slightly larger in order to automatically compensate for any lack of uniformity in the winding of the tape media on the reel. The leader tape can be any compliant material and is preferably an integral part of the tape media, such as the tape media absent the recording surface.

7 Claims, 1 Drawing Sheet

SELF SEALING DATA STORAGE ELEMENT

CROSS REFERENCE TO RELATED APPLICATIONS

This application is related to a patent application titled UNIVERSAL DATA STORAGE ELEMENT, Ser. No. 07/620,275, filed Nov. 30, 1990 now abandoned.

FIELD OF THE INVENTION

This invention relates to data storage systems and, in particular, to a data storage element that contains tape media having a leader tape affixed to one end thereof to seal the tape media from environmental contamination when the tape media is rewound into the housing.

PROBLEM

It is problem in data processing systems to provide data storage media that is secure from environmental contamination, especially for removable media. Removable media can be stored in large automated library systems where they are secure from environmental contamination. An example of these automated library systems is the 4400 Automated Cartridge System manufactured by Storage Technology Corporation, which provides economical and efficient handling of thousands of the industry standard 3480-type magnetic tape cartridges for an associated plurality of tape cartridge drive systems. The automated library system obviates the need for an operator to handle the 3480-type magnetic tape cartridges once they have been entered into the library via a cartridge access port. Elimination of operator presence significantly reduces the likelihood of environmental contamination of the media stored in the automated library. Manual library systems generally consist of racks or shelves on which the 3480-type magnetic tape cartridges are stored by operators. The ambient environment in manual library systems is less controlled than in automated library systems and media contamination is more likely. Finally, many magnetic tape cartridges are manually transported between data centers or used in field data gathering operations. An example of field use is in recording seismic data from oil exploration studies. In such an application, environmental conditions are adverse and media contamination during storage and transport becomes a significant problem.

The media contamination not only causes loss of data on the magnetic tape media but also may cause damage to the read/write heads in the drive element used to process the data on the contaminated magnetic tape media. Read/write head contamination may also pass the contaminants to magnetic tape media subsequently read in the drive element.

SOLUTION

The above described problems are solved and a technical advance achieved in the field by the self sealing data storage element of the present invention. Existing removable data storage media include the industry standard 3480-type magnetic tape cartridge. This data storage element form factor is used to illustrate the present invention, which is embodied in a universal data storage element that uses the 3480-type form factor to house a plurality of types of tape media, including standard 3480-type magnetic tape. The 3480-type magnetic tape cartridge consists of a substantially rectangular exterior housing which contains a single reel of magnetic tape, which tape media has a leader block affixed to one end. The leader block is exposed through an opening in the exterior housing of the magnetic tape cartridge, for use by an associated tape drive to retrieve the tape media from the magnetic tape cartridge. The associated drive element grasps the leader block and extracts the tape media through the opening in one corner of the magnetic tape cartridge. In order to prevent environmental contaminants from damaging the tape media contained within this cartridge, a leader tape is interposed between the leader block and the end of the tape media to automatically seal the tape media from the ambient environment when the tape media has been wound around the takeup reel within the housing. The leader tape consists of a length of compliant material of width at least equal to that of the tape media and of sufficient length to completely encircle the tape media that is wound on the reel within the cartridge housing. Thus, when the drive element rewinds the tape media onto the reel within the cartridge housing, the leader tape is wrapped around the exposed tape media and completely encircles and encloses the tape media once it is wound on the reel. The leader tape thus automatically encapsulates the tape media that is on the reel.

DETAILED DESCRIPTION

Figure 1:
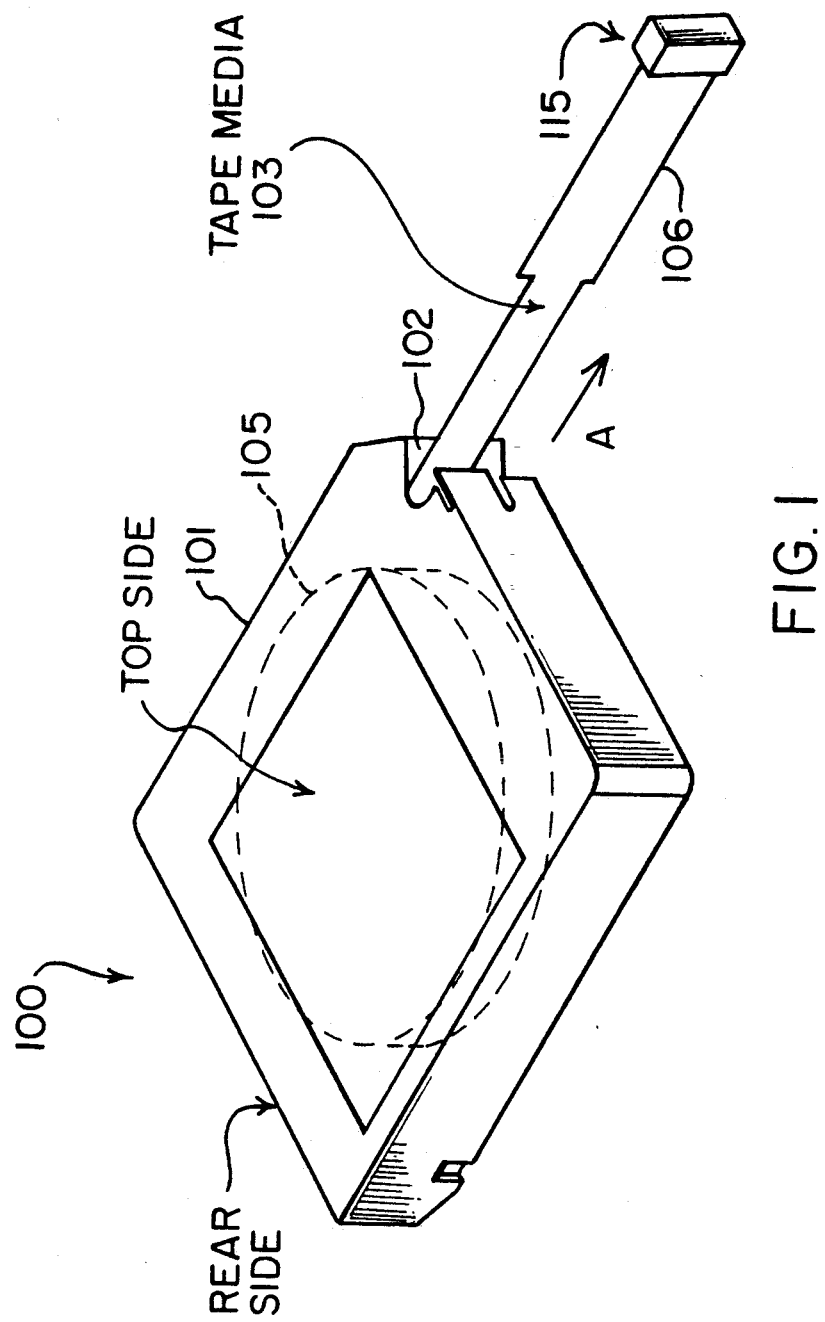
FIG. 1 illustrates the overall architecture of the self sealing data storage element.

Existing removable media data storage and retrieval systems, whether manual or robotic, are predicated on the use of removable data storage elements of predefined and uniform external dimensions, internal structure, media and recording characteristics. The universal data storage element of the present invention presents a uniform form factor data storage element but enables the user to vary the contents to include a selection of media types to provide variable data storage and/or recording characteristics. This enables the user to use multiple types of media in an automated library system or a manually operated media storage and retrieval system, since the form factor of all of the data storage elements contained therein is uniform. The use of the universal data storage element varies the data storage capability of the data storage element to be consistent with the data recording technique used therein. This capability enables the user to use a diversity of drive elements connected to the computer system without having to have a corresponding diversity in media element handling systems.

Removable media presently in use in the data processing industry includes the 3480-type magnetic tape cartridge, which contains a single reel of magnetic tape within a standard form factor housing of predefined dimensions. This magnetic tape cartridge has found wide acceptance in the data processing industry as a standard removable media. The 3480-type magnetic tape cartridge includes an opening on one corner of the housing through which the magnetic tape is retrieved by the associated drive element. The end of the magnetic tape closest to this opening is affixed to a leader block which seats in a mating slot in the opening in the magnetic tape cartridge. The leader block is used by the associated drive element to thread the magnetic tape from the magnetic tape cartridge to a takeup reel located within the drive element. The drive element includes a tape threading arm which grasps the leader block and traverses a complex path in the drive element to thread the magnetic tape across the read/write heads contained therein to the takeup reel.

In traditional data processing centers located within a climate controlled space, this configuration is not highly susceptible to media damage from contaminants. However, many 3480-type magnetic tape cartridges find their way into field environments such as oil exploration applications wherein seismic data is recorded on the magnetic tape in extremely adverse conditions. The handling and storage of 3480-type magnetic tape cartridges in this environment leads to media contamination via environmental contaminants entering the housing of the cartridge through the leader block opening.

In order to overcome this media contamination problem, the data storage element of the present invention makes use of a leader tape interposed between the traditional leader block and the end of the tape media to seal the tape media from contaminants that could enter the cartridge housing via the leader block opening. This solution is compatible with existing 3480-type drive elements. The leader tape is of a predetermined length sufficient to wrap at least once around the reel contained within the tape cartridge when the entirety of the tape media has been rewound onto the reel. The leader tape should be at least as wide as the tape media wound on the reel and preferably of greater width in order to completely cover and seal the tape media from the surrounding environment. The leader tape can be a separate length of material adhesively attached to the end of the tape media or can be a length of the tape media without the recording surface applied thereto. By removing the recording surface from the tape media, the underlying carrier is left and the removal of recording media minimizes the possibility that contaminants would adhere to the leader tape and defeat the purpose of the leader tape.

Self-Sealing Data Storage Element Architecture

FIG. 1 illustrates the overall architecture of the self-sealing data storage element 100. This data storage element 100 consists of a housing 101 that substantially matches the industry standard 3480-type tape cartridge in exterior dimensions and configuration. Housing 101 includes an opening 102 in one corner therein to provide access to the tape media located within housing 101 on a reel 105 that contains, for example, a magnetic tape media 103, which reel 105 is rotatably affixed to the interior walls of housing 101 on opposite facing interior walls thereof. Tape media 103 is extensible from a loaded position, wherein it is located fully within housing 101, to an extracted position, wherein all or part of tape media 103 is extracted from housing 101 and wound on a take up reel (not shown) located external to housing 101 in a drive element into which the data storage element 100 has been loaded.

Media Retrieval

In order to effectuate the extraction of the tape media 103 from housing 102, the standard leader block 115 of the 3480-type magnetic tape cartridge is used. This leader block 115 is affixed via a predetermined length of leader tape 106 to one end (the end furthest from the axis of reel 105) of the tape media 103 wound on reel 105 to provide a point of contact for a media withdrawal element in the associated drive element. A mounting pin mechanism in the drive element receives 103 out of cartridge housing 101 by moving leader block 115 in the direction indicated by arrow A.

Media Variations and Differentiation

At present, there is only one media type loaded into the commercially available 3480-type magnetic tape cartridge. The universal data storage element 100 uses various media types. The media that is placed within universal data storage element 100 can be the traditional 3480-type magnetic tape, which is a single sided, longitudinally recorded, multi-track, mylar backed, magnetically coated tape media. In addition, various other magnetic tape media can be used within the same form factor housing. For example, other half-inch tape configurations can be used, such as tape with helical scan recording format, thin tape, tape with various magnetic coatings that are used in the recording industry and including but not limited to: iron oxide, chromium dioxide, barium ferrite. Furthermore, optically recorded tape media can be used in the same form factor housing as well as combined optical and magnetic tapes or two sided magnetic tape. All of these various tape media are susceptible to environmental contamination to varying degrees and, the self-sealing capability of the apparatus of the present invention is equally applicable to all of these media types.

Self-Sealing Leader Tape

In order to provide the self-sealing capability for the tape media 103 within data storage element 100, a length of leader tape 106 is included between the leader block 115 and the tape media 103. This leader tape 106 can be any compliant material that can be bonded to the tape media 103 and whose mechanical strength is at least equal to that of the tape media 103. This leader tape 106 should be at least as wide as the tape media 103 and preferably a few thousandths of an inch wider in order to completely cover the tape media 103 that is wound on the reel 105 within the housing 101 when the leader tape 106 is wound around the reel 105. Making the leader tape 106 slightly wider than the tape media 103 automatically compensates for any lack of uniformity in the winding of the tape media 103 on reel 105. This extra width enables the leader tape 106 to overlap the tape media 103 and completely cover the tape media 103 from the surrounding environment. The leader tape 106 can be wide enough to extend from the top side to the bottom side of the interior of housing 101.

The leader tape 106 can be an integral part of the tape media 103 or can a separate element adhesively affixed thereto. Preferably, the leader tape 106 is manufactured as an integral part of the tape media 103 and can simply be the standard tape media absent the recording materials that are applied thereto. In the 3480-type environment, the leader tape 106 would thus be a length of mylar backing or carrier material without the iron oxide magnetic recording media attached thereto.

SUMMARY

The self sealing data storage element of the present invention provides a uniform media form factor of well defined exterior dimensions for a multitude of data storage media. In order to prevent environmental contaminants from damaging the tape media contained within this cartridge, a leader tape is interposed between the leader block and the end of the tape media to automatically seal the tape media from the ambient environment when the tape media has been wound around the takeup reel within the housing.

While a specific embodiment of this invention has been disclosed, it is expected that those skilled in the art can and will design alternate embodiments of this invention that fall within the scope of the appended claims.

I claim:

1. A self sealing data storage cartridge, capable of housing a tape media, said data storage cartridge capable of being inserted into a unit for reading/writing data on said tape media, comprising:

housing means, having predetermined exterior dimensions and an interior and having an opening in one corner thereof;

a single reel means, located within said interior of said housing means, for containing a length of said tape media wound thereon;

leader block means, attached to said tape media for transporting said tape media from said interior of said housing means via said opening; and means, mechanically interconnecting said tape media and said leader block means, for sealing said tape media from environmental contamination, independent of said leader block means, when said tape media is substantially completely wound around said single reel means.

2. The data storage cartridge of claim 1 wherein said sealing means comprises:

leader tape means, of width at least equal to said tape media, to completely enclose said tape media on said single reel means when said tape media and said leader tape means are wound completely around said single reel means.

3. The data storage cartridge of claim 2 wherein said leader tape means is of width at least equal to an interior surface-to-surface width of said housing means.

4. The data storage cartridge of claim 2 wherein said leader tape means comprises said tape media absent a recording media applied thereon.

5. A self-sealing data storage cartridge capable of housing a magnetic tape data storage media, said data storage cartridge capable of being inserted into a unit for reading/writing data on said data storage media, comprising:

housing means, having predetermined exterior dimensions of a 3480-type magnetic tape cartridge and an interior and having an opening in one corner thereof;

a single reel means, located within said interior of said housing means, for containing a length of said magnetic tape data storage media wound thereon;

leader block means, attached to one end of said magnetic tape data storage media, for transporting said magnetic tape data storage media from said interior of said housing means via said opening; and leader tape means, of predetermined length and of a width at least equal to said magnetic tape data storage media to completely enclose said magnetic tape data storage media on said single reel means when said magnetic tape data storage media and said leader tape means are wound substantially completely around said single reel means, for sealing said magnetic tape data storage media from environmental contamination, independent of said leader block means, when said magnetic tape data storage media and said leader tape means are completely wound around said single reel means.

6. The data storage cartridge of claim 5 wherein said leader tape means is of width at least equal to an interior surface-to-surface width of said housing means.

7. The data storage cartridge of claim 5 wherein said leader tape means comprises said magnetic tape data storage media absent a recording media applied thereon.

* * * * *